United States Patent
Furuta

[15] 3,687,039
[45] Aug. 29, 1972

[54] MULTI-EXPOSURE DEVICE FOR PHOTOGRAPHIC CAMERAS

[72] Inventor: Koichi Furuta, Tokyo, Japan
[73] Assignee: Nippon Kogaku K.K., Tokyo, Japan
[22] Filed: Oct. 6, 1970
[21] Appl. No.: 78,398

[30] Foreign Application Priority Data
Oct. 9, 1969 Japan......................44/95779

[52] U.S. Cl..............................................95/31 AC
[51] Int. Cl..............................................G03b 19/04
[58] Field of Search.........................95/31 AC, 31 FL

[56] References Cited
UNITED STATES PATENTS
2,304,887 12/1942 Crumrine......................95/31
3,009,406 11/1961 Takahama.....................95/31

Primary Examiner—Samuel S. Matthews
Assistant Examiner—Michael L. Gellner
Attorney—Ward, McElhannon, Brooks & Fitzpatrick

[57] ABSTRACT

A camera having a shutter release button, a film and shutter winding lever and a self-cocking mechanism including a shaft rotatable for charging a shutter, a gear train for advancing a film, a clutch for coupling and decoupling the shaft and gear train, the clutch having a pawl rotatably mounted on the shaft, a cam fixed to the gear train, a pawl being biased against the cam, the pawl and cam being formed to rotate the gear in unison with the shaft in the film advancing direction, the pawl being retractable from the cam to maintain the gear train at rest during rotation of the shaft for multi-exposure operation.

4 Claims, 11 Drawing Figures

Patented Aug. 29, 1972

MULTI-EXPOSURE DEVICE FOR PHOTOGRAPHIC CAMERAS

BACKGROUND OF THE INVENTION

1. Field of the Invention

The present invention relates to a device for use in photographic cameras for optionally preventing and permitting multi-exposure of a single frame.

2. Description of the Prior Art

The technique of exposing the same film many times is widely used in expressing a photographer's feelings, commercial photos, title backs, etc. However, in case of a camera of the so-called self-cocking type in which the charging of the shutter and the advancement of the film are simultaneously made, complex operations permitting the multi-exposure require great care. For instance, after one frame is exposed, the film is advanced (in this case the shutter is also charged). Thereafter, the advanced film is reversed to an original position (the position before the film is advanced) by depressing a rewinding button (A.R button) while rotating a rewinding knob or lever. In rewinding, an operator must observe the index mark or the like which coacts with the movement of the film in order to rewind or reverse the film by a length corresponding to one frame so that the double-exposure may be made. Thereafter, the shutter button is released for double exposure. There is a possibility that deviation of the position of film will occur because the film which is once advanced is rewound or reversed by the length of one frame and that the double-exposure setting had the drawbacks of the complex operation as it consists of rewinding, depression of the A.R button, and check of the length of the film rewound. In the multi-exposure method in which after one frame is exposed, the film is advanced while the rewinding button is kept depressed, the force is applied to the rewinding knob to resist the film winding force of the spool or the friction is applied to the sprocket to hold it stationary so that only the shutter is charged while the film is prevented from being advanced. In consequence, the position of the film is deviated so that the desired double-exposure is not made and in the worst case, the frame exposed twice will not be used unless the next frame is wasted. Furthermore, there is a disadvantage that the rewinding button must be kept depressed when rotating the film advance lever.

SUMMARY OF THE INVENTION

One of the objects of the present invention is to provide a device capable of multi-exposure as in the case of normal photography (single exposure) only by setting a ring of a shutter button to an index mark. According to the present invention, the multi-exposure may be made without advancing the film so that the position of the frame of the film is not deviated at all. Moreover, the multi-exposure operation is very simple.

In a camera of the type having the so-called self-cocking film take-up mechanism in which a shutter is set in response to the rotation of a film take-up or advance lever for advancing the film, the present invention provides a multi-exposure device characterized in that a film take-up shaft is provided with a clutch for coupling a spool and a sprocket to said film take-up shaft and decoupling them therefrom, and an actuating member is provided upon a shaft of a shutter release button, and a transmission member is interposed between said clutch and said actuating member for transmitting the motion of said actuating member to said clutch, to thereby permit the multi-exposure.

Furthermore the multi-exposure operation may be accomplished with ease and with a minimum number of additional parts. In multi-exposure operation, rewinding of the film and operation of the A·R button are not required, the position of the film will not be deviated at all and the double-exposure may be made positively without wasting the next frame. Since the motion is transmitted by employing the outer peripheries of the bearings used in the film take-up gear train and the normal and multi-exposure operations are selected by the outer ring surrounding the shutter release button, the device in accordance with the present invention may be incorporated in a small-sized camera without adversely affecting its compactness.

BRIEF DESCRIPTION OF THE DRAWING

The invention will be explained in detail referring to the attached drawing in which.

DESCRIPTION OF THE PREFERRED EMBODIMENT

Figure 1:
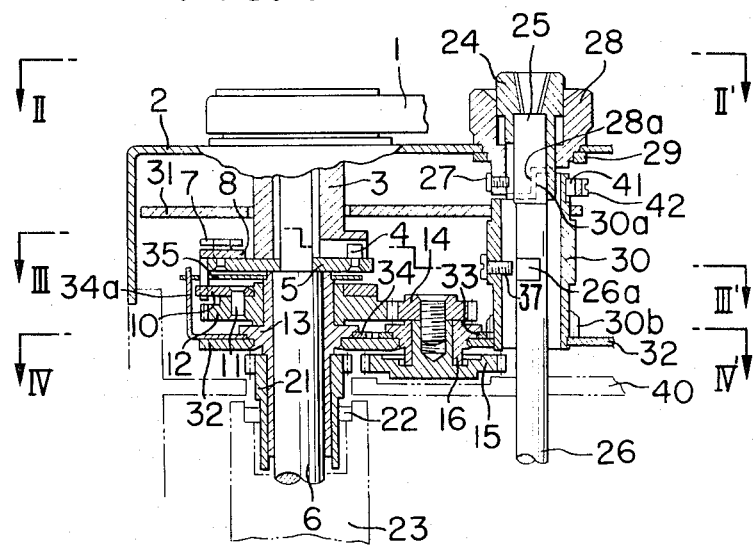
FIG. 1 is a sectional view in elevation of one embodiment of the present invention.
Figure 3:
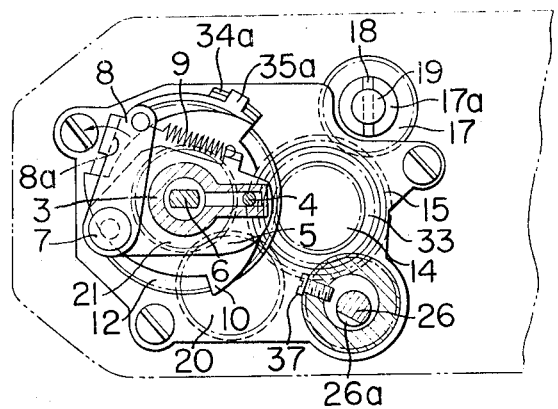
FIG. 3 is a view looking in the direction indicated by III — III' in FIG. 1 and illustrates a normal position (before the film is advanced for normal photography)

One embodiment of the present invention will be described in more detail hereinafter. Referring to FIG. 1, reference numeral 1 designates a film advance lever which is coupled to a film winding cylinder 3 in a manner well known in the art. The film winding cylinder 3 has a slot for receiving a pin 4, provided on a pawl mounting plate, carried by a shutter charging shaft 6 so that the shutter charging shaft 6 is rotated coaxially with the film winding cylinder 3. The pawl mounting plate 5 has a pawl shaft 7 fixed on the upper surface thereof. A pawl 8 is rotatably carried by the pawl shaft 7 and is biased so as to be normally pressed against the outer periphery of a three-blade cam 10 by a spring 9. The three-blade cam 10 is securely fixed to a film winding gear 12 by means of a pin 11 and rotatably fitted over a film take-up bearing 13. The gear 12 is in mesh with an idle gear 14 for taking up the film. The idle gear 14 is securely fixed to an idle gear 15 and is rotatable fitted into an idle gear bearing 16. The idle gear 15 is in mesh with a sprocket gear 17, and transmits the rotation through a groove 17a and a pin 18 to a sprocket shaft 19, to thereby rotate a sprocket (not shown). The idle gear 15 is also in mesh with an idle gear 20 (See FIG. 3) so as to rotate a spool gear 21, thereby rotating a spool 23 through a spool retainer 22. The above-described component parts constitute an normal film take-up mechanism.

A shutter button 24, a shutter button rod 25 and a release shaft 26 are coupled to a shutter release mechanism (not shown). The shutter button 24 is securely held in position by means of a setscrew 27. An actuating member 28 which also serves as a decorative ring for the shutter button 24 is rotatably fitted to the camera top 2 and is prevented from being detached therefrom by means of a retaining member 29. A notched portion 28a formed in the lower portion of the retaining member 28 is made in contact with a notched portion 30a of a multiple-exposure cylinder gear 30 so as to transmit the rotation of the actuating member 28 to the gear 30. The upper portion of the gear 30 is fitted into a top plate 31 while the lower portion is fitted into a lower plate 32 so that the gear 30 may rotate between the top and lower plates 31 and 32. The gear 30b of the gear 30 is in mesh with a multi-exposure idle gear 33 which is fitted over an idle gear bearing 16 fixed to the lower plate 32. A pawl decoupling-coupling gear 34 rotatable fitted over the film take-up shaft bearing 13 is in mesh with the idle gear 33. The leading end 34a of the gear 34 is bifurcated and is in engagement with a projection 35a of a pawl decoupling cam 35 which is rotatably fitted over the upper portion of the film take-up bearing 13. The cam portion 35b of the pawl decoupling cam 35 is made in contact with the inner edge portion 8a of the pawl 8 when the pawl decoupling member 35 is rotated so that the pawl 8 may be forced in the direction indicated by the arrow against the spring 9. (See FIG. 3). The above-described pawl mounting plate 5, the pawl shaft 7, the pawl 8, the spring 9, the three-blade cam 10, and the pawl decoupling cam 35 constitute a clutch for disconnecting the sprocket shaft 19 and the spool 23 from the shutter charging shaft 6. The above-described multi-exposure cylinder gear 30, the idle gear 33 and the pawl decoupling-coupling gear 34 constitute a transmission system for transmitting the rotation of the actuating member 28 to the pawl decoupling cam 35. Reference numeral 36 designates a pin for limiting the rotation of the pawl decoupling-coupling gear; 37, a screw for locking the shutter release shaft in position; 38, a film counter window; 39, a shutter dial; 40, a body; 41, a click spring for the multi-exposure cylinder gear 30; and 42, a setscrew of the click spring 41.

Figure 2:
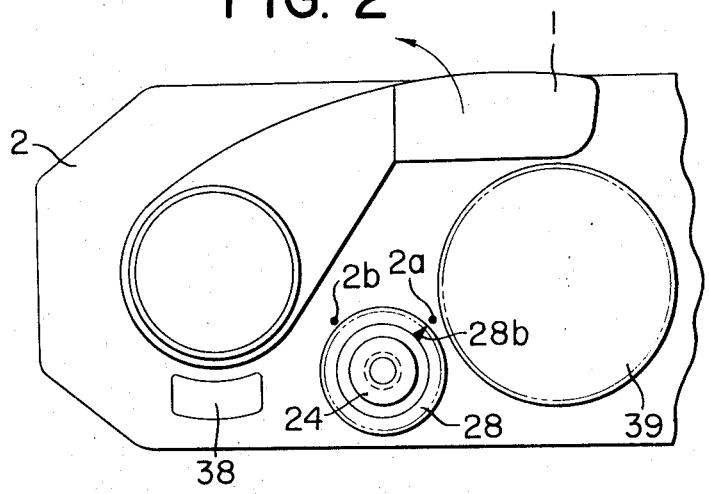
FIG. 2 is a top view thereof looking in the direction indicated by II — II' of FIG. 1 and illustrates a camera top; a film advance lever in normal position and an outer ring of a shutter release button in normal photographic operation.
Figure 4:
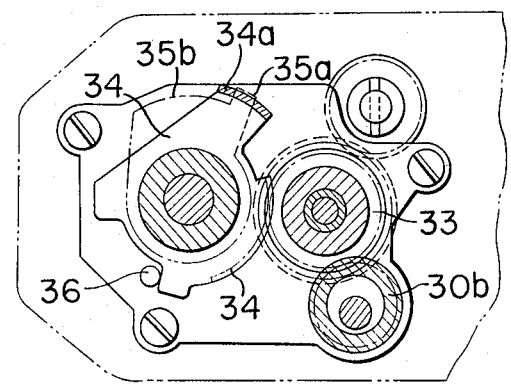
FIG. 4 is a view looking in the direction indicated by IV — IV' in FIG. 1 and illustrates the normal photographic position, that is the double-exposure device is not set.
Figure 5:
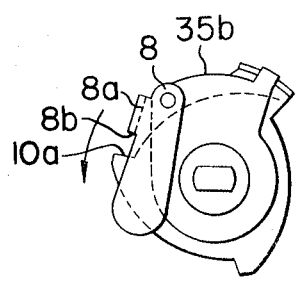
FIGS. 5, 6, 7 and 8 are views for explanation of the film advance operation and the relative positions between a pawl and a three-blade cam.
Figure 6:
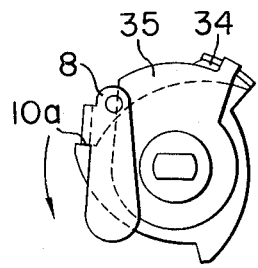
Figure 7:
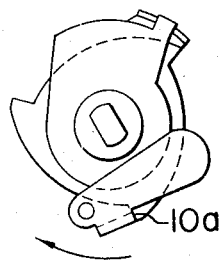

In normal photographic operation, the pointer 28b on the actuating member 28 is set to the index mark 2a upon the camera top (See FIG. 2) so that the pawl decoupling member 35 is held in stationary position as shown in FIG. 4. The position of the cam 35 relative to the pawl 8 is illustrated in FIG. 5. When the film advance lever 1 is rotated in the direction indicated by the arrow 2 in FIG. 2, the rotation is transmitted to the pawl 8 through the film take-up cylinder 3, the film take-up pin 4, the pawl mounting plate 5 and the pawl shaft 7, so that the projection 8b of the pawl 8 in the position shown in FIG. 3 and 5 starts to rotate the three-blade cam 10 in the direction indicated by the arrow in FIG. 6 because the projection 8b makes contact with the stepped portion 10a of the cam 10. The cam 10 stops after it rotates to advance the film by a length corresponding to one frame as shown in FIG. 7. Upon rotation of the three-blade cam 10, the rotation of take-up gear 12 which is integral with the cam 10 causes to rotate the sprocket through the idle gears 14 and 15 and the sprocket gear 17. The rotation of the gear 12 also causes the spool to rotate through the idle gears 14, 15 and 20 and the spool gear 21 so that the film is advanced by one frame. Upon completion of advancing the film the pawl 8 is rotated in the direction indicated by the arrow in FIG. 7 under the force of a return spring (not shown) and returns in contact with the outer periphery of the three-blade cam 10 to the position shown in FIG. 5. Thus, the film is advanced and the film advance lever is returned to its normal position. In the position shown in FIG. 7, the shutter mechanism is charged through the shaft 6 by the rotation of the film advance lever.

Figure 9:
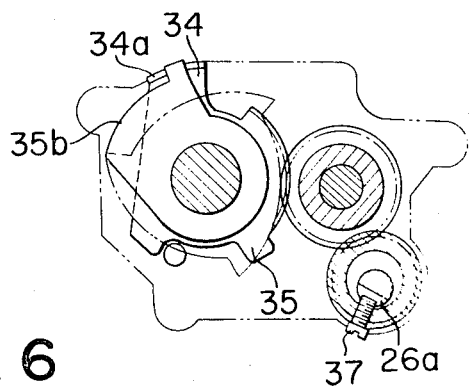
FIGS. 9, 10 and 11 are views for explanation of the actuation of the device for permitting the double exposure and the relations between the pawl and the three-blade cam.
Figure 10:
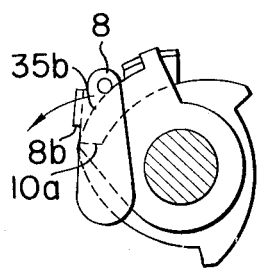
Figure 11:
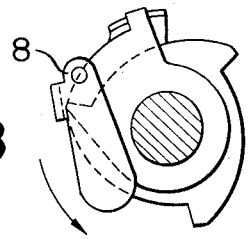
Figure 8:
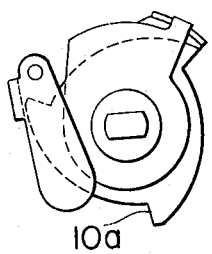

In multi-exposure operation the film is advanced in the manner described above and the shutter is released. Thereafter, only the shutter is charged again so as to be released again. In this case, the actuating member 28 is rotated so that the pointer 28b is set to the index mark 2b upon the camera top so that the notched portion 28a of the actuating member 28 forces the notched portion 30a of the multi-exposure cylinder gear 30 so that the latter is rotated (through an angle corresponding to an angle between the index marks 2a and 2b). Since the lower gear portion 30b of the multi-exposure cylinder gear 30 transmits the rotation to the pawl decoupling-coupling gear 34 through the multi-exposure idle gear 33, the pawl decoupling-coupling gear 34 in the position shown in FIG. 4 is displaced to the position shown in FIG. 9. Therefore, the pawl decoupling cam 35 which is in engagement with the bifurcated end 34a of the pawl decoupling-coupling gear 34 is also displaced so that the cam portion 35b pushes the pawl 8 against the spring 9 in the direction indicated in FIG. 10. Since the diameter of the cam portion 35b is made equal to or larger than the maximum diameter of the three-blade cam 10, the pawl 8 will not push the three-blade cam 10 as shown in FIG. 6 even when the film advance lever is rotated. Therefore, the three-blade cam 10 will not rotate as shown in FIG. 11 and only the pawl 8 rotates in the direction indicated by the arrow so that the film is not advanced while the shutter is charged through the shaft 6.

The multi-exposure cylinder 30 is mounted eccentrically with respect to the release shaft 26. Therefore, while the pointer 28b of the actuating member 28 is being set to the index mark 2b, of the release shaft locking screw 37 locks the shutter button as it is inserted within the notched portion 26a of of the release 26 (See FIG. 9), and on the contrary when the pointer 28b is being reset to the index mark 2a, the shutter is made releasable for the next exposure.

Thus, when the lever 1 is subsequently operated, normal exposure is effected, and there is no fear that the actuating member was not switched over to the normal exposure setting after completion of the prior multi-exposure operation.

For effecting double exposure, it is convenient for the camera to be provided with a shutter button locking device, as above mentioned.

However, for effecting overlapped sequent multi-exposures, it is inconvenient to operate the actuating member 26 each time the shutter release is operated. Accordingly, under this circumstance the release shaft locking screw 27 may be dispensed with.

What is claimed is:

1. A camera having a shutter release button, a film and shutter winding lever and a self-cocking mechanism, comprising:
    a shaft rotatable for charging a shutter;
    gear means for advancing a film;
    clutch means for coupling and decoupling said shaft and said gear means; said clutch means including
    a pawl rotatably mounted on said shaft;
    a cam fixed to said gear means;
    biasing means for biasing said pawl onto said cam;
    said pawl and said cam being formed to rotate said gear in unison with said shaft in the film advancing direction;
    and means operably provided from outside of the camera for optionally retracting said pawl from said cam, against the biasing force of said biasing means, to maintain said gear means at rest during the rotation of said shaft.

2. A camera according to claim 1, wherein said pawl retracting means includes a cam plate coaxially rotatable with respect to said cam and having a cam surface engageable with said pawl for retracting said pawl.

3. A camera according to claim 2, further comprising a manually operable means coupled to said cam plate by gearing and movable between a first position in which said clutch means is actuated for coupling said shutter charging shaft with said gear means and a second position in which said clutch means is disengaged.

4. A camera according to claim 3, wherein said manually operable means includes a knob and a connecting member rotatable therewith, said knob being provided coaxially with the shutter release button.

* * * * *